United States Patent [19]

Kameyama et al.

[11] 4,107,119

[45] Aug. 15, 1978

[54] ADHESIVE COMPOSITION RAPIDLY HARDENABLE AT ROOM TEMPERATURE

[75] Inventors: Akinori Kameyama; Yoshiki Matsunaga; Hiroyasu Saito, all of Iwaki, Japan

[73] Assignee: Nippon Kasei Chemical Co., Ltd., Iwaki, Japan

[21] Appl. No.: 768,761

[22] Filed: Feb. 15, 1977

[30] Foreign Application Priority Data

Jul. 26, 1976 [JP] Japan .................. 51-88934

[51] Int. Cl.$^2$ ...................... C08L 61/04; C08L 61/20
[52] U.S. Cl. .................... 260/29.4 UA; 260/15; 260/72.5; 260/851; 428/504; 428/528; 526/55; 526/52.5; 526/52.2

[58] Field of Search ............ 260/29.4 UA, 72 R, 72.5, 260/851

[56] References Cited

U.S. PATENT DOCUMENTS 3,790,529  2/1974  Fujimura et al. .................. 260/72 R

*Primary Examiner*—Theodore E. Pertilla
*Attorney, Agent, or Firm*—Oblon, Fisher, Spivak, McClelland & Maier

[57] ABSTRACT

An adhesive composition comprises (a) a resinous composition produced by mixing an aromatic primary amine with an aqueous solution or emulsion containing a polymer or copolymer of acrylamide and (b) formaldehyde or a derivative thereof as main components.

8 Claims, No Drawings

ADHESIVE COMPOSITION RAPIDLY HARDENABLE AT ROOM TEMPERATURE

BACKGROUND OF THE INVENTION

1. Field of the Invention

The present invention relates to an adhesive composition, more particularly, it relates to an adhesive composition which can be rapidly hardened at room temperature and which is suitable for an adhesive composition for wood.

2. Description of the Prior Art

Theretofore, resinous condensates or cocondensates of formaldehyde with urea, melamine, phenol, resorcinol etc, (hereinafter, referring to as condensate type resin) have been used for secondary processing to prepare plywoods, particle boards, combined substrates, construction substrates, furniture and other bonded articles.

The hardening of these condensate type resin adhesive compositions is relatively slow at room temperature and accordingly, it is usually necessary to heat it.

In the preparation of the combined substrates, furniture and the other secondary processings wherein a heat-hardening process can not be applied, it takes a long time for a compression as the hardening is too slow at room temperature whereby the productivity is remarkably limited. In order to promote the hardening at room temperature, it has been proposed to add a strong acidic material. However, the method is not preferable because of the stain or deterioration of the substances.

Sometimes, resins having high concentration degree of condensation have been used for the bonding operation at room temperature. However, these resins are not completely water soluble in water whereby it is necessary to use an organic diluent such as methanol. It is not preferable to use an organic solvent as the solvent for an adhesive composition from the viewpoints of the pollution in the working environment and the danger of fire and the public pollution.

On the other hand, the emulsions of resin such as vinyl acetate resin and epoxy resin have been used as the adhesive composition containing no organic solvent. These resins have disadvantages of relatively slow rate of hardening and inferior water resistance.

SUMMARY OF THE INVENTION

It is an object of the present invention to provide an adhesive composition which is rapidly hardened at room temperature and has excellent water resistance.

The object of the present invention is to provide an adhesive composition which comprises (a) a resinous composition produced by mixing an aromatic primary amine with an aqueous solution or emulsion containing a polymer or copolymer of acrylamide and (b) formaldehyde or a derivative thereof as main components.

DETAILED DESCRIPTION OF THE PREFERRED EMBODIMENTS

The aqueous solution containing a polymer or copolymer of acrylamide used in the process of the invention can be usually prepared by a solution polymerization of acrylamide or a mixture of acrylamide and a comonomer in water in the presence of a polymerization initiator and a modifier for degree of polymerization.

Suitable comonomers include vinyl acetate, acrylic acid, acrylic acid esters, methacrylic acid, methacrylic acid esters, styrene, acrylonitrile and mixtures thereof.

Suitable polymerization initiators include persulfates, hydrogen peroxide and the other conventional ones.

Suitable modifier for degree of polymerization include alcohols such as methanol, isopropanol and the other conventional ones.

Besides using the polymerization initiators and the modifiers for degree of polymerization, another additive such as sodium hydrogen sulfite, cupric sulfate, etc., can be added in the polymerization.

The aqueous emulsions containing a polymer or copolymer of acrylamide can be usually prepared by an emulsion polymerization of acrylamide or a mixture of acrylamide and a comonomer which is dispersed in water in the presence of an emulsifier and a polymerization initiator, etc.

The aqueous emulsions containing a polymer or copolymer of acrylamide can be also prepared by mixing the aqueous solution or emulsion of a polymer or copolymer of acrylamide with another aqueous emulsion of the other hydrophilic resin.

The other aqueous emulsions of the other hydrophilic resin can be prepared by an emulsion polymerization of vinyl acetate, acrylic acid, acrylic acid ester, methacrylic acid, methacrylic acid ester, styrene or acrylonitrile if necessary with ethylene or butadiene.

The aqueous emulsion of a polymer or copolymer of acrylamide can be prepared by a polymerization of acrylamide or a mixture of acrylamide and a comonomer in the other aqueous emulsion of the other resin.

When an amount of acrylamide component in the copolymer of acrylamide or the copolymer mixture, is too small, the adhesive strength in water is remarkably low. Accordingly, it is preferable to be more than 10 mole % of the acrylamide components to total monomers.

In the process of the invention, the resinous composition (a) is produced by mixing an aromatic primary amine with the aqueous solution or emulsion containing a polymer or copolymer of acrylamide.

Suitable aromatic primary amines include aniline, phenylenediamine, toluidine, tolylenediamine, aminophenol, xylidine, 4,4'-methylene-dianiline (4,4'-diaminodiphenylmethane).

An amount of the aromatic primary amine can be selected depending upon the hardening time and the water resistance required, and is preferably in a range of 0.2 to 1 equivalent to the acrylamide component used.

The optimum pH of the resinous composition produced by mixing the aromatic primary amine is dependent upon the gelation time required and the kind of the aromatic primary amine, and for example, it is in a range of pH of 3 to 6 in order to cause the gelation within several minutes and to impart high adhesive strength for about 10 min.

The adhesive composition of the invention which is rapidly hardened at room temperature can be produced by mixing the resinous composition (a) with formaldehyde or a derivative thereof.

The derivatives of formaldehyde include formaline, paraformaldehyde, methylal etc.

An amount of formaldehyde (or derivative thereof) is preferably more than about two equivalents to the aromatic primary amine.

When the adhesive composition of the invention is used as an adhesive agent for plywoods, combined substrates, furniture and the other constraction substrates, it is possible to add a filler such as clay, talc, kaoline, asbestos, woody powder, wheat starch, walnut shell powder, coconut shell powder etc.

In the application of the adhesive composition, it is necessary to coat the adhesive composition on the bonding surface in haste because it is rapidly hardened at room temperature. In order to prevent the gelation of the adhesive composition before the coating, it is possible to coat the resinous composition (a) on one surface and to coat formaldehyde or a derivative thereof or a condensate type resin containing a large amount of formaldehyde on the other surface being bonded.

The invention will be illustrated by certain examples, wherein the terms of part and percent respectively mean part by weight and percent by weight unless otherwise specified.

EXAMPLE 1

In a reactor equipped with a stirrer, a thermometer, a reflux condenser and a nitrogen gas inlet, 159.7 wt. parts of deionized water, 2.0 wt. parts of a noinonic surfactant of polypropyleneglycolpolyethyleneglycol ether (Pronon -208 manufactured by Nippon Oils & Fats K.K.), 2.0 wt. parts of a nonionic surfactant of polyoxyethylenenonylphenol ether (Nikkol NP-18 manufactured by Nikko Chemicals K.K.), 0.2 wt. part of potassium persulfate and 8.0 wt. parts of vinyl acetate were charged.

The reaction was carried out at 70° C for 30 minutes in a nitrogen atmosphere. An aqueous solution of 60.9 wt. parts of vinyl acetate and 14.2 wt. parts of acrylamide in 30 wt. parts of deionized water, was added dropwise to the reaction mixture at 70° C for 1 hour.

After the addition, the reaction was continued at 70° C for 5.5 hours and the reaction mixture was cooled to obtain an aqueous emulsion of a resin.

A 100 wt. parts of the resin was admixed with 0.072 mole of each of the following amines and then, a diluted hydrochloric acid was added to adjust pH as shown.

When 10 wt. parts of the resinous composition was admixed with 2 wt. parts of 37 wt. % formaline at the room temperature (23° C), the gelation times were as follows.

| Type of Amines | pH | Gelation time (sec.) |
| --- | --- | --- |
| aniline: | 4.0 | 230 |
| m-toluidine: | 4.0 | 170 |
| 2,4-tolylenediamine: | 4.0 | 195 |
| 0-aminophenol: | 4.2 | 780 |
| m-aminophenol: | 5.0 | 160 |
| p-aminophenol: | 4.7 | 290 |
| m-phenylenediamine: | 4.8 | 360 |
| 2,3-xylidine: | 3.7 | 250 |
| p-anisidine: | 4.7 | 190 |
| 4,4'-methylene-dianiline (4,4'-diaminodiphenylmethane) | 4.8 | 160 |

EXAMPLE 2

A 22.9 wt. parts of m-phenylenediamine was dissolved in 100 wt. parts of 30 wt. % aqueous solution of polyacrylamide (degree of polymerization : 530) and a diluted hydrochloric acid was added to adjust pH to 4.5 whereby a resinous composition was obtained.

When 10 wt. parts of the resinous composition was admixed with 3 wt. parts of 37 wt. % formaline, the gelation time was 170 seconds.

The adhesive composition was coated on one surface of a lauan plywood having a thickness of 4 mm, a width of 25 mm and a length of 80 mm and the other lauan plywood was superposed on the surface to be parallel direction of the grain of wood. The superposed plywoods were compressed under 10 Kg/cm² at the room temperature (23° C) for 10 min.

The tensile shearing strength in normal state and the strength under cyclic boil test (according to Japanese Agricultural Standard) were measured after 24 hours from the release of the pressure. The results are as follows:

| | |
| --- | --- |
| Adhesion Strength (Normal State) | 31.1 kg/cm² |
| Strength under Cyclic Boil Test* | 18.1 kg/cm² |

*A specimen shall be submerged in boiling water for four hours and then dried at a temperature of 60° C ± 3° C during 20 hours. Furthermore, it shall be submerged again in boiling water for four hours and then, shall be continuously kept in the said water until its temperature goes down to a room temperature.

EXAMPLE 3

In the reactor of Example 1, 185.8 wt. parts of deionized water, 2.0 wt. parts of the nonionic surfactant (Pronon -208) and 2.0 wt. parts of the nonionic surfactant (Nikkol NP-18), 8 wt. parts of ethyl acrylate and 0.2 wt. part of potassium persulfate were charged. The reaction was carried out for 30 minutes in the condition of Example 1. An aqueous solution of 72.1 wt. parts of ethyl acrylate and 14.2 wt. parts of acrylamide in 30 wt. parts of deionized water, was added dropwise to the reaction mixture for 1 hour. After the addition, the reaction was continued at 70° C for 5.5 hours, the reaction mixture was cooled to obtain an aqueous emulsion of a resin. A 100 wt. parts of the resin was admixed with 6.9 wt. parts of m-aminophenol and the pH was adjusted to 4.5. When 10 wt. parts of the resinous composition was mixed with 2 wt. parts of 37 wt. % formaline, the gelation time was 135 seconds. In accordance with the adhesive test of Example 2, the plywoods with the adhesive composition were compressed under 10 kg/cm² at the room temperature (23° C) for 10 min.

The tensile shearing strength of the adhered plywoods after the following time from the release of the pressure are as follows.

| Time | Strength (kg/cm²) |
| --- | --- |
| At release | 7.5 |
| 10 min. | 12.7 |
| 60 min. | 20.3 |
| 3 hours | 25.5 |
| 24 hours | 33.1 |

The strength under cyclic boil test after 24 hours from the release was 23.1 kg/cm².

EXAMPLE 4

A resinous composition was produced by mixing 229.3 wt. parts of an aqueous emulsion of vinyl acetate resin (resin content 30 wt. %) with 47.3 wt. parts of 30 wt. % aqueous solution of polyacrylamide (acrylamide polymer) and 18.6 wt. parts of aniline was further added.

The pH of the resinous composition was adjusted to 4.0. When 10 wt. parts of the resinous composition was mixed with 2 wt. parts of 37 wt. % formaline, the gelation time was 232 seconds.

In accordance with the process of Example 2, the plywoods with the adhesive composition were compressed under 10 kg/cm² at the room temperature (23° C) for 5 min.

The tensile shearing strengths in various conditions after 24 hours from the release of the pressure are as follows:

| | |
|---|---|
| Adhesion Strength (Normal State) | 24.5 kg/cm$^2$ |
| Strength under Hot and Cold Soaking Test* | 17.5 kg/cm$^2$ |
| Strength under Cyclic Boil Test | 7.8 kg/cm$^2$ |

*A specimen shall be submerged in hot water at a temperature of 60° C ± 3° C for three hours and then shall be continuously kept in the said water until the temperature goes down to a room temperature As the reference, the test was repeated by using an aqueous emulsion of a resin prepared without an addition of aniline.

As the results, the strength in the normal state was 25.3 kg/cm$^2$ but the test pieces were peeled off in the tests under treating in hot and cold water immersion and the test under repeating a boiling treatment (cyclic boil test).

EXAMPLE 5

In accordance with the process of Example 1, acrylamide was added in an emulsion polymerization of vinyl acetate, an aqueous emulsion of a resin (molar ratio of vinyl acetate component to acrylamide component of 9 : 1; resin content of 37 wt. %) was obtained.

A resinous composition was produced by mixing 100 wt. parts of the aqueous emulsion of the resin with 5 wt. parts of p-anisidine and the pH was adjusted to 4.5. When 10 wt. parts of the resinous composition was mixed with 1.2 wt. parts of 37 wt. % formaline, the gelation time was 255 seconds.

In accordance with the process of Example 2, the plywoods with the adhesive composition were compressed under 10 kg/cm$^2$ at the room temperature (23° C) for 5 min.

The tensile shearing strengths of the adhered plywoods after the following time from the release of the pressure are as follows.

| Time | Strength (kg/cm$^2$) |
|---|---|
| At release | 6.5 |
| 10 min. | 9.6 |
| 60 min. | 15.6 |
| 24 hours | 27.0 |

EXAMPLE 6

In accordance with the process of Example 1, acrylamide was added in the emulsion polymerization of vinyl acetate (except using 90.4 wt. parts of deionized water), an aqueous emulsion of a resin (molar ratio of vinyl acetate component to acrylamide component of 8:2; resin content of 40 wt.%) was obtained.

A resinous composition was produced by mixing 100 wt. parts of the aqueous emulsion of the resin with 10.5 wt. parts of m-aminophenol and the pH was adjusted to 4.4. When 10 wt. parts of the resinous composition was mixed with 3 wt. parts of 37 wt.% formaldehyde, the gelatin time was 190 seconds.

A three ply lauan plywood was prepared with the adhesive composition.

The conditions for preparing the lauan plywood and the adhesive strength after 24 hours (Japanese Agricultural Standard) were as follows.

(a) Condition for preparing plywood:

| | |
|---|---|
| Substrates: | Three sheets of lauan having a thickness of 1.7 mm. |
| Water content: | 7 % |
| Amount of Adhesive composition coated: | 30 g/(30cm)$^2$ |
| Compressing: | 10 kg/cm$^2$ for 5 min. without heating |

(2) Adhesive strength:

| | Strength | Percentage of break of woody sheet |
|---|---|---|
| Normal state: | 13.2 kg/cm$^2$ | 70 % |
| Under treating in hot and cold water immersion: | 13.0 kg/cm$^2$ | 50 % |
| Under cyclic boil test: | 11.0 kg/cm$^2$ | 40 % |

As the reference, the test was repeated by using an aqueousemulsion of a resin prepared without an addition of m-aminophenol.

As the results, the strength in the normal state was 13.6 kg/cm$^2$ and the percentage of break of woody sheet was 70 wt. % but the test pices were peeled off in the test under treating in hot and cold water and the test under repeating a boiling treatment.

What is claimed is:

1. An adhesive composition which comprises (a) a resinous composition produced by mixing an aromatic primary amine with an aqueous solution or emulsion containing a polymer of acrylamide or a copolymer of acrylamide and copolymerizable comonomers, and (b) formaldehyde or a formaldehyde derivative capable of liberating formaldehyde in situ, as main components.

2. An adhesive composition according to claim 1 wherein said copolymer of acrylamide is a copolymer of acrylamide and vinyl acetate.

3. An adhesive composition according to claim 1 wherein said copolymer of acrylamide is a copolymer of acrylamide and ethyl acrylate.

4. An adhesive composition according to claim 1 wherein said aqueous emulsion is a mixture of polyacrylamide and an aqueous emulsion of vinyl acetate resin.

5. An adhesive composition according to claim 1 wherein said aromatic primary amine is selected from the group consisting of aniline, toluidine, 2,4-tolylenediamine, aminophenols, phenylenediamine, xylidine, anisidine and 4,4'-diamino-diphenylmethane.

6. An adhesive composition according to claim 1 wherein the amount of said aromatic primary amine is in the range of 0.2 to 1 equivalent relative to the amount of acrylamide component in the polymer or copolymer.

7. An adhesive composition according to claim 1 wherein the amount of said formaldehyde or formaldehyde derivative capable of liberating formaldehyde in situ is more than 2 equivalents relative to the amount of said aromatic primary amine.

8. The adhesive composition of claim 1, wherein said resinous composition is adjusted to a pH of 3-6.

* * * * *